June 2, 1959 F. M. PIERCE 2,889,012
BRAKE STRUCTURE
Filed Jan. 12, 1953 2 Sheets-Sheet 2

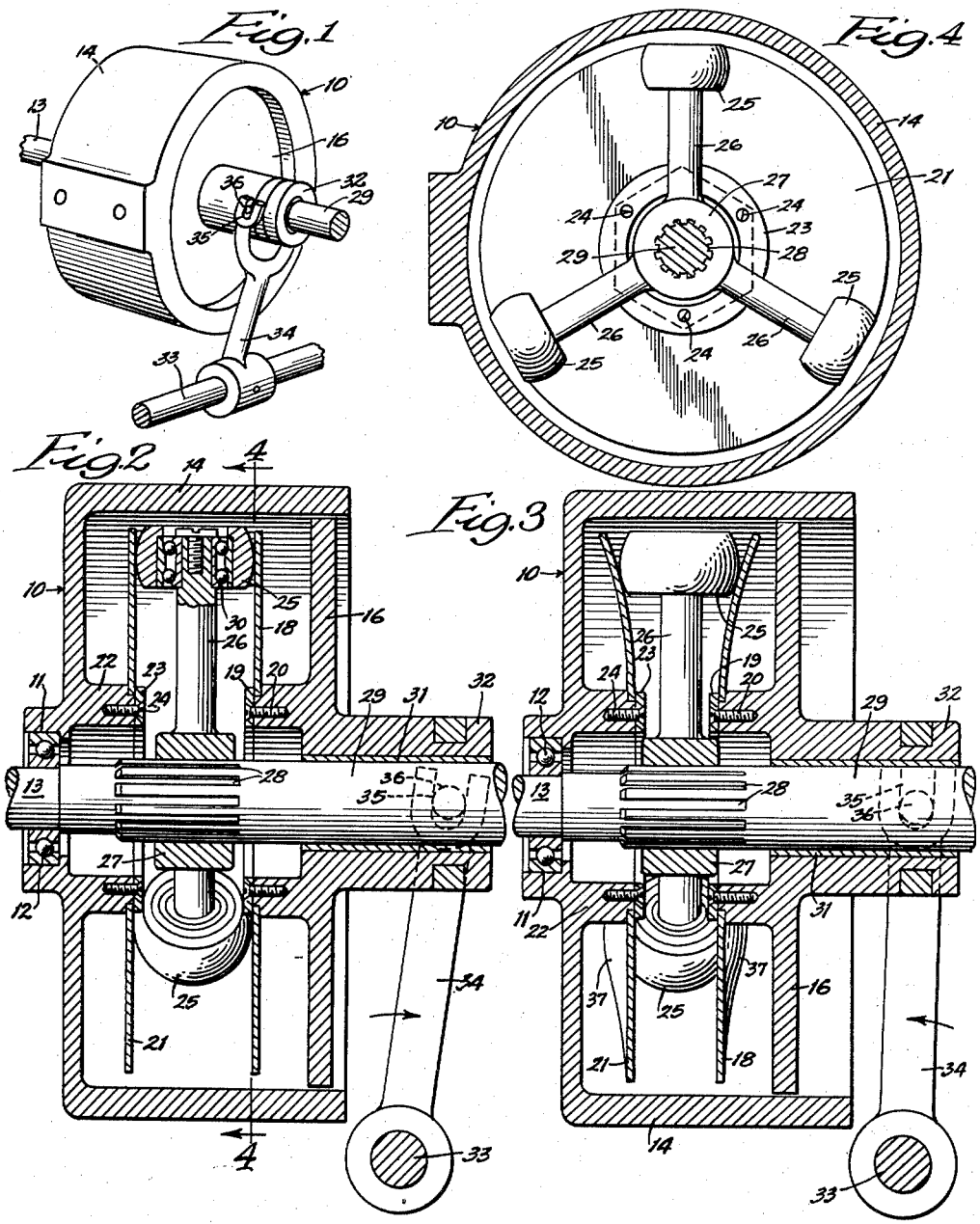

INVENTOR:
Frank M. Pierce,
BY Dawson, Tilton & Graham,
ATTORNEYS.

2,889,012

BRAKE STRUCTURE

Frank M. Pierce, Miami, Fla., assignor to Frank Mossman Pierce Corporation, Chicago, Ill., a corporation of Illinois Application January 12, 1953, Serial No. 330,699

7 Claims. (Cl. 188—80)

This invention relates to a brake structure, and more particularly to a type of brake structure in which roller elements are spaced between two resilient discs which are spaced apart in a flexed condition by the rollers.

An object of the invention is to provide a new method of applying resistance to a moving wheel without substantial sliding friction. A further object is to provide two flexible spring discs having between them several small rollers spaced apart, the discs being pressed toward each other to a flexed condition while the discs revolve with respect to each other and the rollers rotate to bring about a strongly regulative roller resistance. Yet another object is to produce a sensitive and effective brake through the use of flexed discs in which there is substantially no sliding friction between the parts while at the same time there is a roller resistance between the flexed portions of the disc producing a powerful and regulated resistance or braking action. Other specific objects and advantages will appear as the specification proceeds.

The invention is shown, in an illustrative embodiment, by the accompanying drawings, in which—

Figure 5:
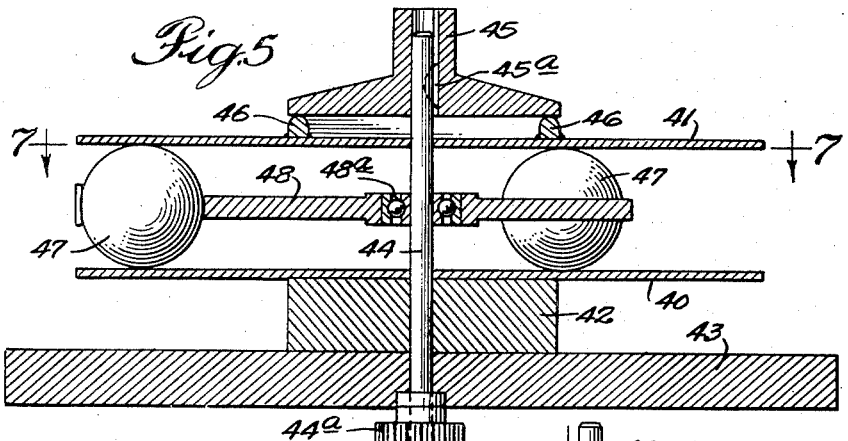
Figure 6:
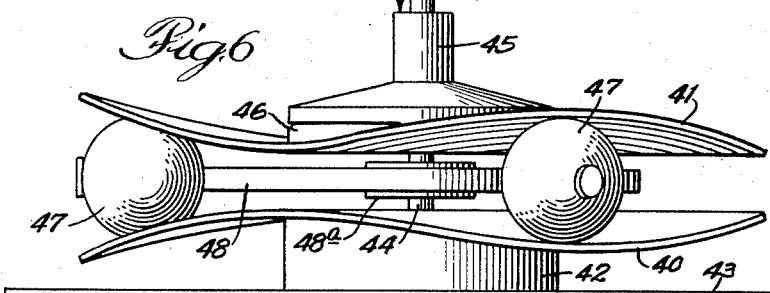

Figure 1 is a perspective view of a modification illustrating one form of my invention; Fig. 2, an enlarged, vertical, sectional view; Fig. 3, a vertical sectional view similar to Fig. 2 but showing the discs in flexed or compressed condition; Fig. 4, a sectional view on a reduced scale, the section being taken at line 4—4 of Fig. 2; Fig. 5, a vertical sectional view of a simplified form of the structure and with the discs mounted in a horizontal plane; Fig. 6, a view similar to Fig. 5 but showing the discs compressed; and Fig. 7, a horizontal sectional view, the section being taken as indicated on line 7—7 of Fig. 5.

It will be understood that the invention may be embodied in various forms of structures in which two flexible spring discs are pressed together to flex the discs about rollers therebetween and rotating the disc with respect to each other to produce the desired regulative roller resistance. In the specific form illustrated in Figs. 1 to 4, inclusive, I provide a casing 10 providing on a vertical wall a bearing surface 11 in which are mounted bearings 12 receiving a shaft 13. The casing 10 also provides an outer wall 14.

At its forward end, a spring disc 18 is secured to the plate or disc 16 by annular plate 19 and screws 20. Similarly, an opposed resilient disc 21 is secured to the housing 10 and to an annular projection 22 integral therewith by means of a plate 23 and screws 24. The discs are spring steel discs and when pressure is exerted thereon as illustrated in Fig. 3, the discs flex outwardly when opposed by the rollers 25. The rollers 25 are rotatably mounted upon arms 26 carried by a central hub 27, the hub being grooved to receive splines 28 carried on the enlarged portion 29 of shaft 13 and is therefore rotatable therewith. If desired, the rollers 25, formed of rubber, other resilient material, or any other suitable material, may be mounted upon anti-friction rollers or other devices 30. The shaft 13 extends laterally through a bearing sleeve 31 mounted in the extension portion 32 of the plate member 16.

I prefer to provide means for moving one of the plates, as, for example, plate 16, inwardly toward the opposed housing wall 10 to flex the steel plates 18 and 21, as illustrated in Fig. 3. In the specific illustration given, I provide a rotatable shaft 33, to which is fixed an arm 34 having a fork 35 engaging a pin 36. The pin 36 extends into and is secured to the plate extension 32 of plate 16. Rotation of shaft 33 in a counterclockwise direction causes the pin 36 and the plate extension 32 to be moved inwardly so as to press disc 18 against the rollers, thus causing both discs to flex, as illustrated in Fig. 3. The flexing causes the discs 18 and 21 not only to flex outwardly near their ends, but to form pocket-like enclosures 37 about the rollers 25, as illustrated best at the bottom of Fig. 3. Thus the individual rollers are held in pockets between the discs and as the rollers are moved in one direction, resistance is exerted upon them by the pocket formations and thus there is a highly regulated and controlled resistance to movement of the rollers, the arms 26 and hub 27 and thereby through the splines 28 to the shaft 29.

It will be understood that the friction may be exerted upon the shaft 29 in the manner illustrated in Fig. 3, or, if desired, the friction may be exerted solely through the rotation of one disc, as, for example, disc 18. Such operations are equivalent.

*Operation*

In the operation of the structure illustrated, the spring discs 18 and 19 remain in unflexed position when the lever 34 is swung to the outer position, as illustrated in Fig. 2. When the lever 34 is swung inwardly, the discs 18 and 21 are spread and flexed by the rollers 25. In this operation, the discs 18 and 21 not only spring apart but they tend to enclose and form pockets about the rollers 25 and the pockets resist movement of the rollers 25. When the shaft 13 is rotated to carry the hub and arms 26 and rollers 25 in a circular path between the discs 18, considerable resistance is presented to such movement because of the pocket flexing of the discs. The rollers have, in effect, to climb over a hill or squeeze between narrowed portions of the disc repeatedly as they pass in an angular course between the discs. Further, the flexing of the resilient material forming the rollers increases the resistance thereon. Even when the rollers are formed of steel or other rigid material, the pocket enclosure of the rollers presents great resistance to the movement of the rollers and gives a strong regulated or controlled braking action.

When the brake structure is not in operation, the pressure upon the spring discs 18 and 21 may be released by moving the lever 34 to the right, as indicated in Fig. 2.

It will be understood that the roller and spring disc structure herein illustrated in a specific manner may be employed in many different types of structures. The discs may be in horizontal position or in vertical position, or in any other desired position. It is only necessary that the spring discs be supported in opposed relation and that one disc be revolved with respect to the other and that the roller support structure be revolved relative to the two discs, after the flexing operation, to effect the desired regulated brake action. Further, by employing means for effecting movement of the discs toward each other, it is possible to increase or decrease the pressure upon the rollers and thus make the braking action greater or less.

Figure 7:
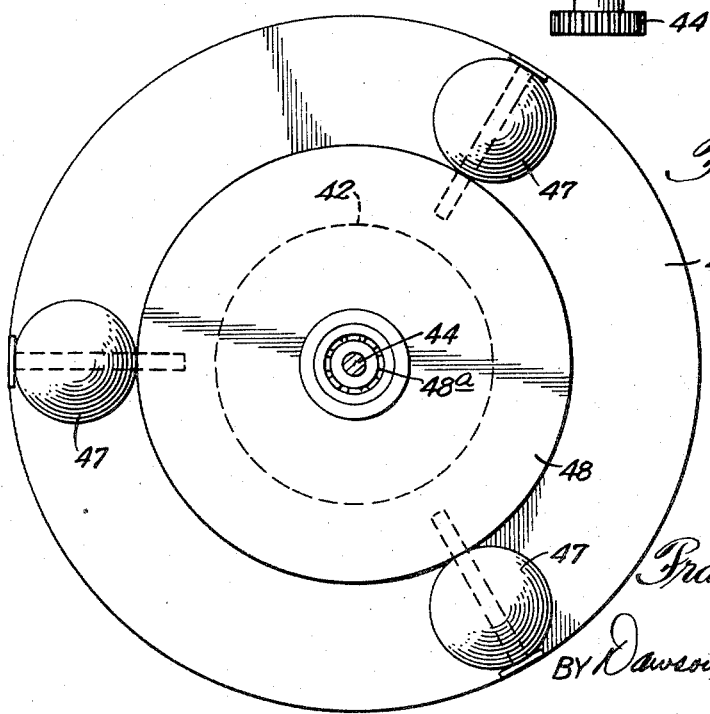

In the simplified modification illustrated in Figs. 5, 6 and 7, the discs 40 and 41 are mounted in a horizontal plane. The disc 40 is adjacent a stationary block 42 carried in turn by a support 43. In operation, the disc 40, in one form, may be secured to the member 42, and is thereby restrained against rotation, while the upper disc 41 is free to rotate. The parts may receive a shaft 44 extending upwardly through the support 43, block 42, discs 40 and 41, and the presser member 45. The presser member 45 rests upon a circular rim 46 welded or otherwise secured to the upper disc 41. For certain uses, it may be desirable to have the member 45 directly welded or otherwise secured to the disc 41. Member 45 is keyed to shaft 44 as at 45a to rotate therewith. The rollers 47 formed of steel, plastic, rubber, or any other suitable material, are rotatably supported upon pins carried by the inner support member 48 through which the member 47 also passes. Support member 48 is equipped with an anti-friction bearing 48a to permit relative rotational movement between support member 48 and shaft 44.

In the operation of the structure, as the member 45 is pressed downwardly, the discs 40 and 41 form flexed areas about the rollers 47, as indicated best in Fig. 6, and as the member 45 is rotated through means 44a which may be a gear, pulley, etc., to produce rotation of disc 41, a resistance to the rotation of the disc is set up, since each roller is obliged to travel from an enlarged passage through a restricted passage, as indicated more clearly in Fig. 6.

In the foregoing, it will be clear that this is a new way of applying resistance to a moving wheel or disc. Between two or more of the flexible spring steel discs and with several small rollers spaced between them, it is possible by compressing the discs to a flexed condition and by rotating but one of them (41), to obtain a strong regulated roller resistance and a powerful brake without slidable friction between the discs. The structure may be employed singly or in multiple, as desired, and the discs may be arranged horizontally, vertically, or in any desired angular arrangement.

While in the foregoing specification I have shown a specific structure in considerable detail for the purpose of illustrating an embodiment of the invention, it will be understood that such details of structure may be varied widely by those skilled in the art without departing from the spirit of my invention.

I claim:

1. A brake structure, comprising a pair of spaced apart spring discs, stationary means for supporting one of said discs to prevent the same from rotating, a shaft extending through the discs, arms connected to said shaft and extending outwardly between said discs, and rollers rotatably mounted upon said arms, means for pressing said discs toward each other to form flexing portions around each roller, and means for rotating the other of said discs and said arms relative to each other and relative to said one disc.

2. A roller brake, comprising a shaft equipped with radial arms, rollers rotatably mounted on the end portions of said arms, a pair of discs enclosing said rollers, means for supporting said discs, said support means being movable coaxially to move said discs toward each other to flex said discs about said rollers to provide pockets extending about a portion of said rollers, said discs being rotatable relative to each other, and means for moving said rollers on said shaft.

3. The structure of claim 2, in which the rollers have a resilient surface.

4. A brake structure, comprising a pair of flexible discs, one of said discs being restrained against rotation, a plurality of rollers between said discs and spacing the same apart, means supporting the rollers for revolution about the same axis as that of the discs, the last means being mounted for movement relative to the discs coaxially thereof, means for compressing at least one of said discs against said rollers to form flexed pocket portions receiving said rollers, and means for rotating one of said discs.

5. A brake structure, comprising a pair of flexible discs, means for rotating said discs relative to each other, a plurality of rollers between said discs and spacing the same apart, means for compressing at least one of said discs against said rollers to form flexed pocket portions receiving said rollers, means supporting the rollers for revolution about the same axis as that of the discs, the last means being mounted for movement relative to the discs coaxially thereof.

6. A brake structure comprising a pair of spaced apart spring discs, means supporting one of said discs against movement and means for pressing said discs toward each other, a shaft extending through the centers of said discs, arms mounted on said shaft and extending outwardly between said discs, rollers rotatably mounted on said arms for rotational movement when said discs rotate relative to each other and are pressed toward each other to contact said rollers, said arms being movable coaxially on said shaft, means for rotating said arms and the other of said discs on said shaft relative to the first mentioned of said discs, and means for rotating the other of said discs relative to said arms.

7. A roller brake comprising a shaft having radial arm means equipped with rollers rotatably mounted on the end portions of said arm means, a pair of discs enclosing said rollers and having said shaft extending through the centers thereof, means for moving said arm means together coaxially to contact said rollers with said discs, one of said discs being stationary, the second of said discs and said arm means being rotatable relative to said stationary disc, one of said second disc and said arm means being fixed to said shaft and the other being rotatable thereto.

References Cited in the file of this patent

UNITED STATES PATENTS

| | | |
|---|---|---|
| 1,528,841 | Myers | Mar. 10, 1925 |
| 1,584,211 | Burke | May 11, 1926 |
| 2,375,639 | Falk | May 8, 1945 |
| 2,560,015 | Waldron | July 10, 1951 |